Figure 1:
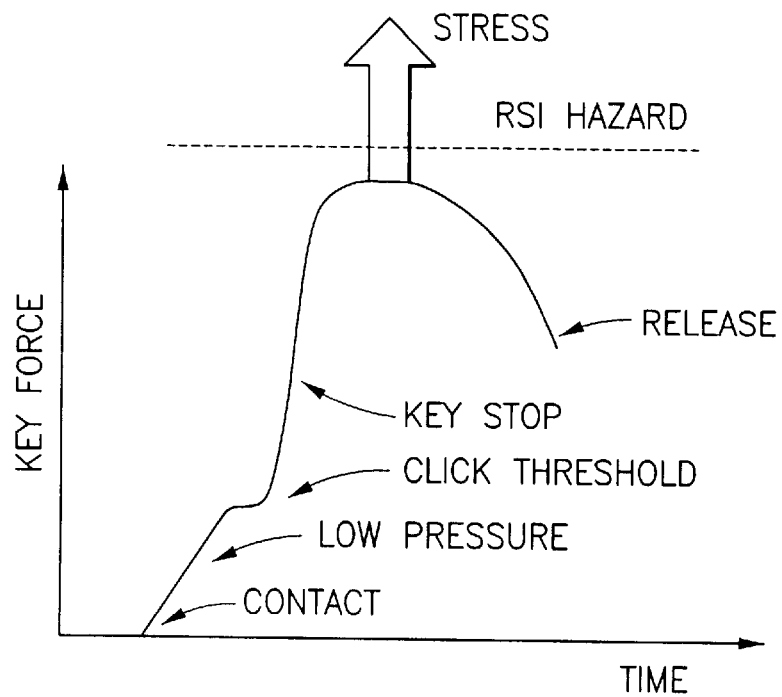

United States Patent [19]
Korth

[11] Patent Number: 5,902,257
[45] Date of Patent: May 11, 1999

[54] DEVICE FOR THE PREVENTION OF RSI SYMPTOMS

[75] Inventor: Hans-Erdmann Korth, Stuttgart, Germany

[73] Assignee: International Business Machines Corporation, Armonk, N.Y.

[21] Appl. No.: 08/748,774

[22] Filed: Nov. 14, 1996

[51] Int. Cl.⁶ .................................................. G01H 11/00
[52] U.S. Cl. ................ 601/23; 601/37; 702/41; 341/34; 434/227
[58] Field of Search .................................... 128/739, 774; 364/508; 341/34; 702/176, 41, 56; 706/924, 926; 601/23, 37, 40; 434/227–232

[56] References Cited

U.S. PATENT DOCUMENTS

| | | | |
|---|---|---|---|
| 5,433,211 | 7/1995 | Brammer et al. | 128/739 |
| 5,434,566 | 7/1995 | Iwasa et al. | 341/34 |
| 5,579,238 | 11/1996 | Krugman | 364/508 |
| 5,675,329 | 10/1997 | Barker et al. | 341/22 |
| 5,745,376 | 4/1998 | Barker et al. | 438/433 |

FOREIGN PATENT DOCUMENTS

WO 87/01023  2/1987  WIPO.
WO 92/18927  10/1992  WIPO.

OTHER PUBLICATIONS

Article entitled *Old Keyboard Design Raises Health Issues* by Chris Partridge as appeared in *New Electronics,* May 23, 1990, No. 5, Dartford, Kent, GB; pp. 69–70.

*Primary Examiner*—Glenn E. Richman
*Attorney, Agent, or Firm*—Ohlandt, Greeley, Ruggiero & Perle

[57] ABSTRACT

The present invention describes a device and a method to prevent RSI symptoms when keys are operated, and it contains a measuring device (4) to determine the force acting on the key, a device to compare the measured force with a finger stress model, and a device to make critical finger impact values (14, 16) perceptible. The inventive device may be positioned directly on the keyboard (2) as a stand-alone device, or it may be designed as part of a data processing system.

4 Claims, 1 Drawing Sheet

DEVICE FOR THE PREVENTION OF RSI SYMPTOMS

The present invention relates to a device and/or a method to prevent RSI symptoms associated with the use of keyboards.

RSI is an established abbreviation in medicine, standing for "Repetitive Strain Injury (RSI)". RSI describes a syndrome which is particularly widespread among professional computer users and data typists.

The RSI syndrome often occurs only after several years of intensive typing activity on keyboards. RSI is triggered by overload on the finger joints and tendons as the keys are pressed.

Even the most intensive sort of typing on keyboards does not lead to the RSI syndrome if the keyboard users are careful when operating the keys. A higher level of tension develops in the finger muscles, triggered by nervousness or stress, with the result that the fingers acquire a greater degree of rigidity. This greater rigidity reduces the ability to absorb mechanical impacts.

Moreover, nervousness and stress result in more forceful operation of the keys. As a result of this, the fingers are jarred when the keys are operated, and consequently the residual impulse cannot be completely absorbed by the muscular tissue. This gives rise to overload on the joints and tendons.

In essence, the state-of-the-art as regards the avoidance of RSI hazards is restricted to the use of ergonomically optimised keyboards. However, these keyboards are not capable of completely excluding RSI hazards. Ultimately, this is dependent on correct typing behaviour on the part of the user. But one disadvantage of these keyboards is that the user is not given any feedback in the event of behaviour which promotes RSI.

It is therefore the task of the present invention to develop a device for the prevention of RSI symptoms, which will determine critical finger stress values and communicate them to the user. Moreover, it should be possible to use this device without the need to modify keyboards which are already in existence.

The essential advantages of the present invention lie in the fact that the user receives constant feedback about his typing behaviour, so that he is enabled to modify this behaviour over the long term in such a way that no further RSI symptoms will occur. To assist him in doing this, acoustic and visual means are used to make him aware of typing behaviour which threatens to induce RSI. Key parameters are adapted to suit personal typing behaviour in order to prevent RSI symptoms.

Learning programs also assist the user. The present invention may be part of the keyboard as a stand-alone device, or it may also be part of a data processing system.

The present invention is explained in more detail using a preferred design example.

Illustration 1 shows a diagram of the finger stress when a key is operated.

Illustration 2 shows a preferred design form of the inventive device.

Illustration 1 shows the stress on the fingers when the key is operated. The progression of forces may be subdivided into two phases:

1. Acceleration: this phase is entirely controlled by the muscles and the force of gravity. An average length for the acceleration path is 20 mm.
2. Delay: this is the critical phase. The finger hits the key. After overcoming the pre-tension of the key spring, the key is pressed downwards. As the pressure on the key increases, the key reaches a 'click' position. The 'click' position is immediately followed by the end of the key path, and the finger is jarred. Pressure on the finger increases until the finger-key impulse is absorbed. The length of the delay path is approximately 4 mm.

On the basis of this analysis, a finger stress model is obtained with a defined limit range. Account is taken here of the following influencing variables:

the force and/or impulse values measured in absolute terms values dependent on physiological factors, such as the size of the hands, the musculature and mobility individual characteristics classified according to sorts of typing When the limit values are exceeded, RSI symptoms are to be expected.

The inventive device can ensure that every key stroke is recorded over an interval of time. From this, a certain average value is calculated for each key, which is compared with the limit values for the finger stress model. If the limit value is exceeded, the user is given information, e.g. via his PC screen or PC loudspeaker.

Figure 2:
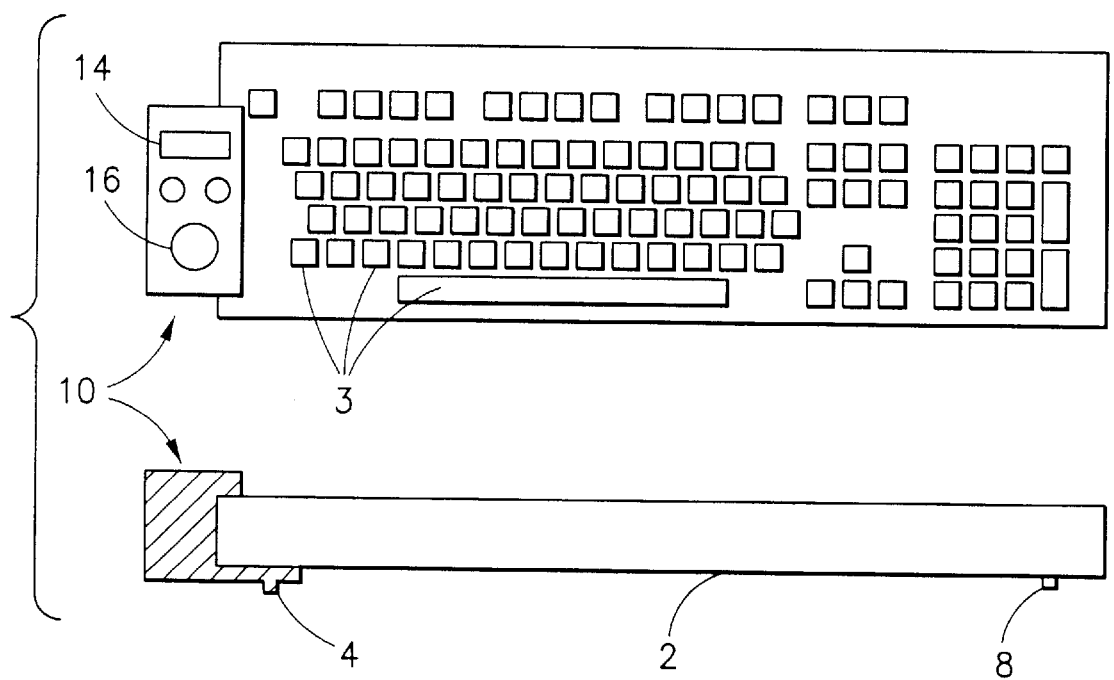

Illustration 2 shows a normal keyboard 2 with the inventive device 10. The inventive device 10 can be used on a keyboard 2 which is already in existence, or also a typewriter, as a stand-alone design version (see FIG. 2), or as an additional device in combination with a computer.

In the case of the stand-alone design version, the inventive device 10 is positioned directly on the keyboard 2. The inventive device 10 essentially contains a force sensor 4, which is preferentially positioned in or on the supporting base of the keyboard 2; a microprocessor; and acoustic 16 and/or visual 14 display instruments. Since RSI symptoms occur when the keys 3 are operated, the inventive device 10 must measure the force with which the finger presses down the key 3. The measurement of the force is achieved by measuring the keyboard 2 weight, i.e. the force sensor 4 measures the differences in the weight of the keyboard 2 when the key 3 is operated. The force signal is a direct measurement of the impact from the finger on the key 3. One sensor 4 is adequate to measure the force, since the location of each key 3 is specified within the keyboard 2. In this design form, the force sensor 4 simultaneously serves the purpose of a supporting base for the keyboard 2. A further supporting base 8 is positioned on the other side of the keyboard 2. The force sensor 4 preferably contains a band pass filter, whose tasks are to eliminate the influence of the keyboard 2's own weight, and to prevent the influence of vibrations.

The force sensor 4, with a band pass filter, measures the finger impact on the key 3. Use may also be made of other measuring methods which are familiar to experts.

The microprocessor analyses the time progression of the force signal and evaluates this on the basis of the finger stress model. If the specified limit values are exceeded, the user is informed. If the average finger impact value on the key 3 exceeds a critical value, visual and/or acoustic means are used to make the user aware that his typing behaviour must be modified in order to prevent RSI symptoms. The inventive device 10 preferably includes a visual display 14, for example a liquid crystal display or a light-emitting diode display, by means of which the critical values (short- and long-term values) can be displayed.

The inventive device 10 can also be implemented by a computer. In this case, as in the case of the stand alone design version, the force sensor 4 is located on the keyboard 2. The signals generated by the force sensor 4 are digitalised and loaded into the computer's main memory via the keyboard interface. An application program to determine RSI includes a finger stress model which is used to analyse the measured forces. The user is notified of critical values via the computer screen. Acoustic feedback can support the visual information. Further support can be provided to the user by means of learning programs about the avoidance of RSI hazards.

Furthermore, the inventive device 10 offers the possibility of automatically adapting the spring characteristics to the typing behaviour of the respective user, by means of a servo system which (for example) can electro-mechanically modify the spring characteristics of keys, in order to avoid the occurrence of critical finger impact values.

I claim:

1. A system for preventing RSI symptoms when keys of a keyboard are operated, said keyboard supported by plural supports, and comprising:

a force sensor comprising at least one said support;

means for signalling a user of said keyboard; and a processor coupled to said force sensor and responsive to a time progression of sensed force signals therefrom, to determine force values applied to a respective key, in part, based upon a location of said key with respect to said force sensor, and for comparing said time progression of force values to a force stress model and for generating a user perceivable output from said means for signalling if a force value on said respective key exceeds said force stress model.

2. The system as recited in claim 1, wherein said processor derives an average of force values for a key and causes said user perceivable output if said average exceeds said force stress model.

3. The system as recited in claim 2, further comprising:

means for altering a required key pressure to activate a key in response to said average exceeding said force stress model.

4. The system as recited in claim 1, wherein said system is configured in a form to be user-removable from said keyboard.

* * * * *